Sept. 7, 1937.     R. FOOTE     2,092,448
ARMORED CAR
Filed Dec. 8, 1934     3 Sheets-Sheet 1
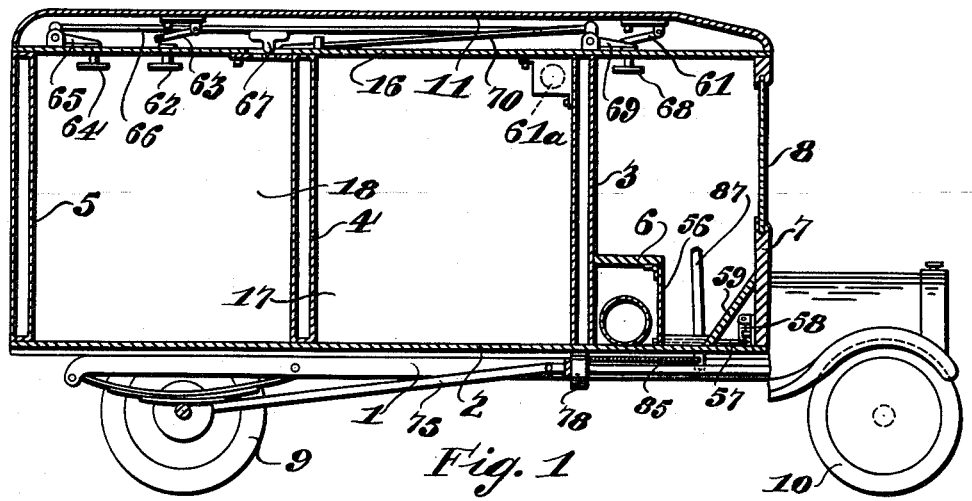
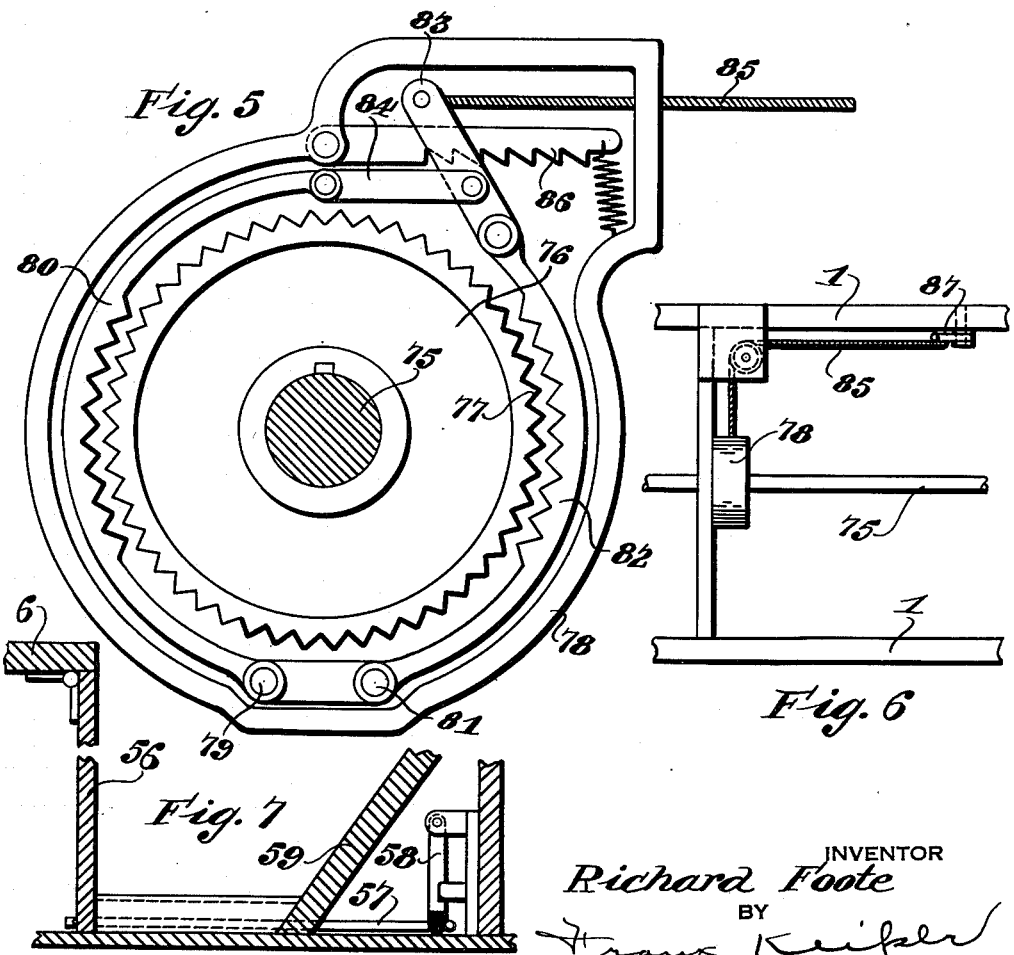
INVENTOR
Richard Foote
BY
Frank Keiper
ATTORNEY Sept. 7, 1937.　　　　R. FOOTE　　　　2,092,448
ARMORED CAR
Filed Dec. 8, 1934　　　3 Sheets-Sheet 2

INVENTOR
Richard Foote
BY
Frank Keifer
ATTORNEY

Sept. 7, 1937.  R. FOOTE  2,092,448
ARMORED CAR
Filed Dec. 8, 1934  3 Sheets-Sheet 3
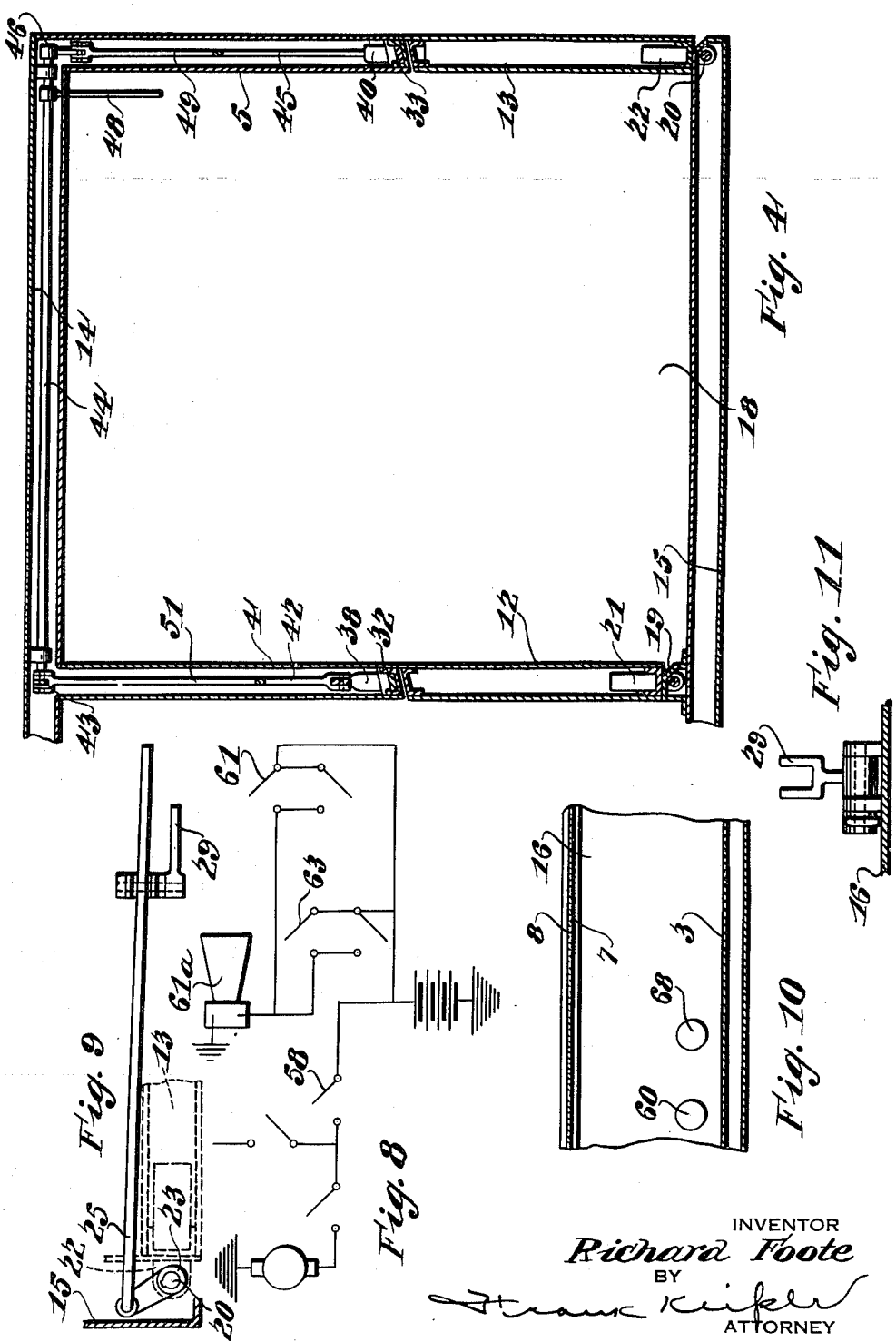
INVENTOR
Richard Foote
BY
ATTORNEY Patented Sept. 7, 1937

2,092,448

UNITED STATES PATENT OFFICE 2,092,448

ARMORED CAR

Richard Foote, Rochester, N. Y., assignor to Robert F. Jones, Pittsford, N. Y.

Application December 8, 1934, Serial No. 756,645

8 Claims. (Cl. 296—24)

The object of this invention is to provide an armored car divided into compartments, with doors therefor with certain safety devices thereon which will prevent or delay the opening of both doors from the outside.

Another object of the invention is to provide an armored car that can be used by express companies, et cetera for the delivery of money and valuables, said car having compartments that cannot be readily invaded from the outside.

These and other objects of the invention will be illustrated in the drawings, described in the specification, and pointed out in the claims at the end thereof.

In the drawings:

Figure 1 is a vertical, longitudinal section of the car.

Figure 4 is a horizontal section on the line 4x—4x of both Figures 2 and 3.

Figure 5 is an enlarged detail view of the locking device that is used on the drive shaft.

Figure 6 is a top plan view of the connections between the locking device of Figure 1 and the lever for operating it.

Figure 7 is an enlarged detail view of the mechanism for operating the master switch that controls the ignition, and lights, and all other electric circuits of the car except the alarm signals.

Figure 8 is a diagrammatic view of the electrical connections.

Figure 9 is a top plan view of the mechanism for raising and lowering the plate that covers the holes for the locking bolts.

Figure 10 is a bottom plan view of the ceiling over the driver's seat in Figure 1.

Figure 11 is a detail view of the bell cranks 28 and 29.

In the drawings like reference numerals indicate like parts.

Figure 2:
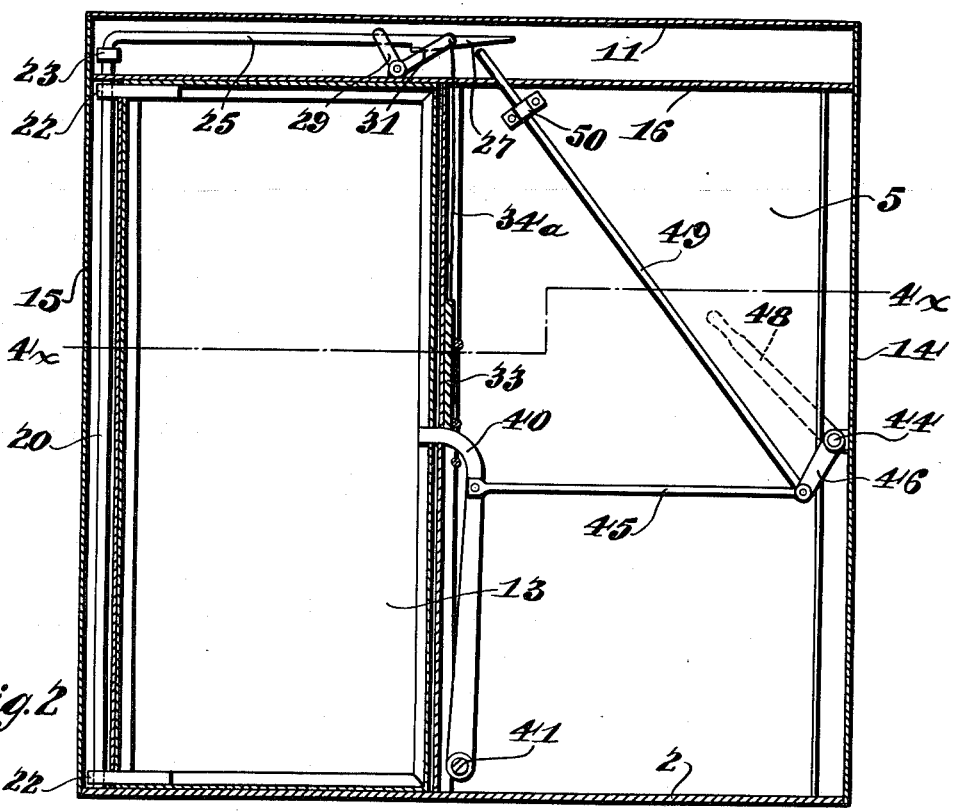
Figure 2 is a vertical, transverse section through the car body and the rear door, looking to the right from the left hand end of Figure 1.
Figure 3:
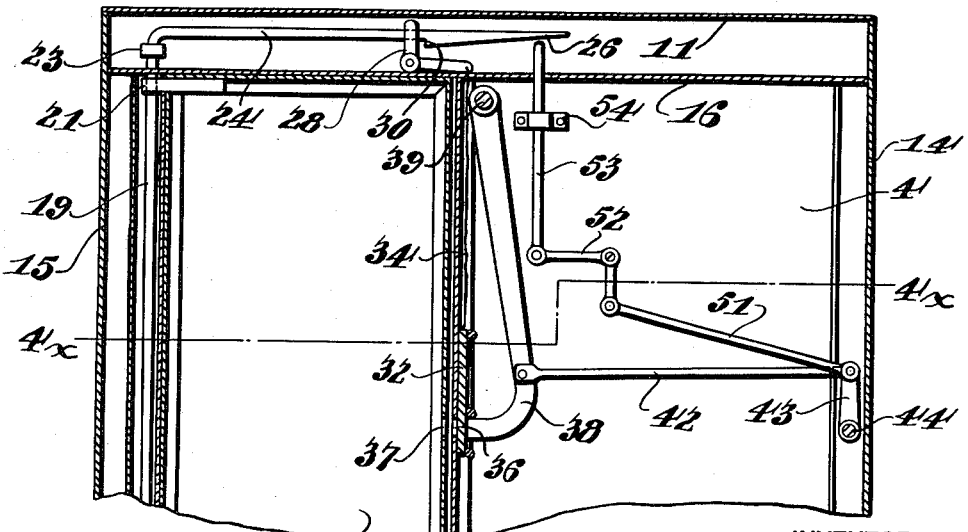
Figure 3 is a vertical section through the inner door and the car body, looking to the right in Figure 1.

In the drawings reference numeral 1 indicates the frame or chassis of the car having a body 2 mounted thereon. In this body is the front wall 3, a middle wall 4, and a rear wall 5. In front of the front wall 3 is located the driver's seat 6, and dash 7, and glass window 8. The chassis is mounted on wheels 9 and 10, as in an ordinary truck. The top of the car is covered with a roof 11. The middle wall 4 is shown in Figure 3 in connection with a swinging door 12. The rear wall 5 is shown in Figure 2 in connection with a swinging door 13. The car body is inclosed with suitable sides 14 and 15 which, together with the cross-walls, and doors, and the ceiling 16, and the floor, form compartments 17 and 18.

The side walls 14 and 15 and the front wall 3 have no opening therein except small ventilating openings. Between the ceiling 16 and the roof 11 is inclosed a compartment in which are contained certain moving parts that will presently be described.

The door 12 is carried on the upright shaft 19 and the door 13 is carried on the upright shaft 20. The hinges 21 and 22 are rigidly fastened to the shafts 19 and 20 so that the shaft in each case swings with its door. On top of each of the shafts 19 and 20 is a crank 23 shown in Figure 9. This crank swings with the door and shaft. Connected to this crank is the link 24, which is moved longitudinally by the swinging of the crank. Each of these links 24 and 25 has a tapered end 26 and 27. Pivotally mounted in the compartment above the ceiling are the bell cranks 28 and 29. Each of the links 24 and 25 has a shoulder 30 and 31 thereon, which is adapted to engage with one arm of the bell crank and rock the bell crank as the link is drawn to the left, shown in Figures 2 and 3. As the links 24 and 25 move to the left, they rock the upright arms of the bell crank to the left as shown in Figures 2 and 3, and raise the horizontal arms of the bell crank in each case for a purpose that will presently be described.

Concealed in the wall 4 is a sliding plate 32, and concealed in the wall 5 is a sliding plate 33. The plate 32 is connected by a link or cable 34 to the horizontal arm of the bell crank 28, and the plate 33 is connected to the horizontal arm 31 of the bell crank 29 by a cable or rod 34a. When the door 12 swings shut on its hinge, it draws the link 24 to the left, and rocks the bell crank 28, and raises the plate 32. When the door 13 swings shut on its hinge, it rocks the shaft 20, and draws the link 25 to the left, and rocks the bell crank 29, and lifts the plate 33. When either of the plates 32 or 33 lift they uncover an opening 36 in the jamb and a similar opening 37 in the stile of the door. Mounted in the wall 4 is a bolt 38. This bolt swings on a shaft 39. Mounted in the wall 5 is a bolt 40, which swings on a shaft 41. Connected to the bolt 38 is a link 42, which link is connected to an arm 43 keyed to the rock shaft 44. Connected to the bolt 40 is a link 45, connected to an arm 46 keyed to the rock shaft 44.

The arm 43 extends up from the rock shaft 44, and the arm 46 extends down from the rock shaft 44, and as the rock shaft rocks to move the link 42 to the left in Figure 3, it will operate to move the link 45 to the right in Figure 2. At the same time that the link 42 moves to the left, it will cause its bolt 38 to make locking engagement with the door 12, and at the same time the link 45 will move to the right and cause the bolt 40 to be withdrawn from the door 13 in Figure 2. It will thus be seen that when either door is unlocked or released, the other door will be locked against movement. It will also be seen that both doors cannot be unlocked at the same time.

On the shaft 44 is keyed a lever 48, which extends through the side wall into the rear compartment 18. By this lever the shaft 44 is rocked. Connected to the arm 46 is a link 49 that extends up through a guide 50 and is adapted to engage the forward or free end of the link 25. Connected to the arm 43 is a link 51, which is connected to one end of a bell crank 52. The other end of this bell crank is connected to a link 53, which slides in a guide 54. When the shaft 44 is rocked in one direction it pulls the link 53 down, and pushes the link 49 up. When it is rocked in the other direction it pushes the link 53 up and pulls the link 49 down. When either rod moves up, it engages the free end of the link 24 or 25, as the case may be, and lifts the shoulder thereon out of engagement with the upright arm of the bell crank 28 or 29. This releases the bell crank so that the plate 32 or 33 can drop. As shown in Figure 2, the plate 33 rides on the bolt 40, and will remain in elevated position as long as the bolt 40 is in position to lock the door 13. When the bolt 40 is withdrawn and the plate 33 drops, it covers the opening in the jamb of the door, and the end of the bolt rests against the plate. This prevents the bolt from moving into locking position and holds the door unlocked. It also prevents the bolt from interfering with the closing of the door.

In like manner, the plate 32 will rest on the bolt 38 when the bolt is in locking position but will drop down and close the opening when the bolt 38 is withdrawn. By means of the one rock shaft 44, and the links 42 and 45, and the rods 49 and 53, the plates 32 will be released alternately to drop down on the bolts and drop further down to hold the bolts in unlocking position, and each plate will only be raised when its door is closed, and each plate can drop down only when its door is unlocked.

In this way, it will be impossible to open both doors at the same time, and the outer door can be opened only when the inner door is closed, and the inner door can be opened only after the outer door is closed. As the valuables will be kept in the inner compartment, access to them by a bandit will be prevented, or at least will be greatly delayed.

The opening of the doors is controlled by the lever 48, which is in the rear, or outer, compartment, and entirely in the control of the man in that compartment.

Pivotally mounted under the seat 6 is a heel board 56, which can be kicked back by the driver in an emergency. It is hinged at the top. Connected to the bottom of this heel board is a link 57, the forward end of which engages loosely with the lower end of the master switch blade 58. In an emergency the driver can kick the heel board 56 back and open the switch 58, which breaks both the ignition and the light circuits and cuts out the starting motor. This switch is completely inclosed in the compartment shown at the right of Figure 7, and cannot be replaced or closed except by taking up the floor board 59.

Above the driver's seat is placed a push button 60, which can be pushed up by the driver, and this closes the switch 61, which causes the "Klaxon" horn 61a, or any other alarm signal, to sound until the compartment at the top of the car is opened and the switch is opened. A similar push button 62 is provided in the rear compartment, which closes the switch 63 above it. A push button 64 is also provided, which rocks a bell crank 65 and pulls on the link 66, and breaks a tear gas bomb 67.

A similar button 68 is placed at the front, by which a bell crank 69 is operated, which pushes a link 70, which can also be used to break the tear gas bomb.

In Figure 5 is the drive shaft 75 having a disc 76 keyed thereon. On the periphery of this disc is formed a series of teeth 77. A housing 78 surrounds this toothed disc. Pivoted at 79 is the shoe 80, and pivoted at 81 is the shoe 82. An arm 83 is provided which is pivoted on the free end of the shoe 82 and is connected to the shoe 80 by the link 84. To this arm is connected a cable 85 shown in Figures 5 and 6. When the cable 85 is drawn to the right in Figure 5, the arm 83 swings to the right at the top and draws both shoes with their toothed faces into engagement with the teeth on the disc 76. This effectually locks the disc and the drive shaft 75 against rotation. The arm 83 is engaged by the ratchet 86, and is locked in the forward position to which it is drawn by the cable 85, and cannot be released except by opening up the housing. The cable 85 is operated by the lever 87 provided for that purpose in the driver's cab.

I claim:

1. In an armored car, the combination of a car body having a front wall and a rear wall and an intermediate wall, a swinging door in the rear wall and a swinging door in the intermediate wall, shafts on which each of said doors are mounted to swing, said shafts swinging with said doors, a crank on the upper end of each of said shafts, a link connected to the end of said crank, a hook near the end of said link, a bell crank having two arms, with one arm of which said hook is adapted to engage to move the bell crank in one direction, a plate mounted to slide in the jamb of the doorway and connected to the other arm of said bell crank, said jamb and said door having holes therein in line with each other, a bolt adapted to swing into said holes and lock the door to the jamb, said hook and bell crank being adapted to raise the plate above said holes when the door is closed.

2. In an armored car, the combination of a car body having a front wall and a rear wall and an intermediate wall, a swinging door in the rear wall and a swinging door in the intermediate wall, said car having a side wall, a shaft mounted to rock in said side wall, a door jamb for each of said doors, said jamb and its door having a bolt opening therein, a bolt for each door in said rear wall and said intermediate wall, mounted to swing on a horizontal axis into and out of said openings, said bolts being oppositely connected to said rock shaft whereby the rocking of said shaft will cause one of said bolts to make locking engagement with its door and will withdraw the other bolt from locking engagement with its door.

3. In an armored car, the combination of a car body having a front wall and a rear wall and an intermediate wall, a swinging door in the rear wall and a swinging door in the intermediate wall, said car having a side wall, a shaft mounted to rock in said side wall, a door jamb for each of said doors, said jamb and its door having a bolt opening therein, a bolt for each door mounted to swing into and out of said openings, said bolts being oppositely connected to said rock shaft whereby the rocking of said shaft will cause one of said bolts to make locking engagement with its door and will withdraw the other bolt from locking engagement with its door, a plate sliding inside of each door jamb adapted to cover the opening in the jamb for said bolt, means for raising up each of said plates to uncover its opening in the jamb when its door is closed and means to lower each of said plates to cover its opening when its door is opened.

4. In an armored car, the combination of a car body having a wall, a door mounted to swing in the wall, a door jamb with which the door is normally in line when the door is closed, said jamb and door having holes therein adapted to receive a bolt, a bolt mounted to swing into and out of said holes from behind the jamb for the purpose of locking and releasing the door, a plate mounted to slide back of the jamb adapted to cover the hole in the jamb when the bolt is withdrawn and the door is opened, means for raising said plate on the closing of the door to uncover said holes and permit the locking of the door by the bolt.

5. In an armored car, the combination of a car body having a wall, a door mounted to swing in the wall, a shaft on which said door swings, a crank on the upper end of said shaft, a link connected to the end of said crank, a hook near the end of said link, a bell crank having two arms with one arm of which said hook is adapted to engage to move the bell crank in one direction, a plate mounted to slide in the jamb of the doorway connected to the other arm of said bell crank, said jamb and said door having holes therein in line with each other, a bolt adapted to swing into said holes and lock the door to the jamb, said hook and bell crank being adapted to raise the plate above said holes when the door is closed.

6. In an armored car, the combination of a car body having a front wall and a rear wall and an intermediate wall, a swinging door in the rear wall and a swinging door in the intermediate wall, said car having a side wall, a shaft mounted to rock in said side wall, a door jamb for each of said doors, said jamb and its door having a bolt opening therein, a bolt for each door mounted to swing on a horizontal axis into and out of said openings, cranks connected to said rock shaft at each end thereof, links connecting said cranks to said bolts, said cranks and said bolts being oppositely connected to said rock shaft whereby the rocking of said shaft and said cranks will cause one of said bolts to make locking engagement with its door and will withdraw the other bolt from locking engagement with the other door.

7. In an armored car, the combination of a car body having a front wall and a rear wall and an intermediate wall, a swinging door in the rear wall and a swinging door in the intermediate wall, said car having a side wall, a shaft mounted to rock in said side wall, a door jamb for each of said doors, said jamb and its door having a bolt opening therein, a bolt for each door mounted to swing on a horizontal axis into and out of said openings, cranks connected to said rock shaft at each end thereof, links connecting said cranks to said bolts, said cranks and said bolts being oppositely connected to said rock shaft whereby the rocking of said shaft and said cranks will cause one of said bolts to make locking engagement with its door and will withdraw the other bolt from locking engagement with the other door, a plate sliding inside of each door jamb adapted to cover the opening in the jamb for said bolt, means for raising up each of said plates to uncover its opening in the jamb when its door is closed, and means to lower each of said plates to cover its opening when its door is opened.

8. In an armored car, the combination of a car body having a front wall, a rear wall, an intermediate wall, and a side wall, a swinging door in the rear wall and a swinging door in the intermediate wall, shafts on which each of said doors are mounted to swing, said shafts swinging with said doors, a door jamb for each of said doors, said jamb and its door having bolt openings therein, a bolt for each door mounted to swing into and out of said openings, a rock shaft mounted in said side wall, cranks connected to said rock shaft at each end thereof, links connecting said cranks to said bolts, a crank on the upper end of each of said shafts on said doors, a link connected to the end of said last named crank, a hook near the end of said link, a bell crank having two arms, with one arm of which said hook is adapted to engage to move the bell crank in one direction, a plate mounted to slide in the jamb of the doorway and connected to the other arm of said bell crank, a lever connected to said crank on said rock shaft, said lever being adapted to cause said hooks to disengage from one of said arms on said bell crank to release said bell crank from the hook and permit said plate to drop when said doors are opened.

RICHARD FOOTE.

CERTIFICATE OF CORRECTION.

Patent No. 2,092,448. September 7, 1937.

RICHARD FOOTE.

It is hereby certified that the above numbered patent was erroneously issued to "Robert F. Jones, of Pittsford, New York" as assignee of the entire interest therein, whereas said patent should have been issued to the inventor --Richard Foote, and said Robert F. Jones as assignee of one-half interest only, as shown by the record of assignments in this office; and that the said Letters Patent should be read with this correction therein that the same may conform to the record of the case in the Patent Office.

Signed and sealed this 29th day of July, A. D. 1941.

(Seal)

Henry Van Arsdale,
Acting Commissioner of Patents.